United States Patent [19]

Moon, Jr.

[11] 4,363,463
[45] Dec. 14, 1982

[54] PLUNGER SEAL ASSEMBLY AND METHOD OF MAKING THE SAME

[75] Inventor: William T. Moon, Jr., Knoxville, Tenn.

[73] Assignee: Robertshaw Controls Company, Richmond, Va.

[21] Appl. No.: 804,598

[22] Filed: Jun. 8, 1977

[51] Int. Cl.³ ............................................. F16K 31/165
[52] U.S. Cl. .................................... 251/61; 251/61.5; 251/214; 277/125
[58] Field of Search ....................... 251/214, 61.5, 61; 277/123, 124, 125, 212 F, DIG. 6

[56] References Cited

U.S. PATENT DOCUMENTS

| | | | |
|---|---|---|---|
| 1,717,114 | 6/1929 | McNulty | 277/124 |
| 3,282,594 | 11/1966 | Wheeler | 277/125 |
| 3,455,564 | 7/1969 | Dega | 277/134 |
| 3,516,679 | 6/1970 | Schmitt | 277/123 |
| 3,698,726 | 10/1972 | Schettler | 277/125 |
| 3,762,384 | 10/1973 | Day et al. | 123/119 A |
| 3,837,687 | 9/1974 | Leonard | 277/125 |
| 3,973,782 | 8/1976 | Evans | 277/212 F |

Primary Examiner—A. Michael Chambers
Attorney, Agent, or Firm—Candor, Candor & Tassone

[57] ABSTRACT

An assembly of a seal unit and a plunger-like member movable relative to the seal unit, the seal unit comprising a washer-like resilient seal member having an opening therethrough and press-fittingly receiving the plunger therethrough in such a manner that an inner peripheral portion of the washer-like seal member is turned into substantially parallel sealing and wiping engagement with the plunger while being substantially transverse to the remainder of washer-like seal member.

8 Claims, 3 Drawing Figures

PLUNGER SEAL ASSEMBLY AND METHOD OF MAKING THE SAME

This invention relates to an improved plunger seal assembly and to a method of making the same.

It was found when making a fluid operated valve positioner of the co-pending patent application, Ser. No. 804,599, filed June 8, 1977, now U.S. Pat. No. 4,198,030 issued Apr. 15, 1980, (Robertshaw Controls Company) wherein a flexible diaphragm of an actuator unit carries a main valve member to position the same relative to its main valve seat in a valve unit in relation to the degree of actuation of the actuator unit, that suitable seal means must be provided between the stem member of the main valve member and the actuator unit because the stem extends from the valve member to the flexible diaphragm of the actuator unit.

Accordingly, it is a feature of this invention to provide improved seal means for such a fluid operated valve positioner or the like.

In particular, it had been proposed to provide a seal means formed from a cup-like member containing a plurality of ring-like self lubricated packing members disposed in stacked relation and having the valve stem passing therethrough. However, it was found that when the clearance between the valve stem and the inside diameter of the ring-like seal members was small enough to prevent leakage along the valve stem, the valve stem would tend to stick.

Conversely, if the clearance was made larger to permit free movement of the valve stem in the ring-like seal members, then the controlled pneumatic pressure signal in the actuating chamber of the actuator unit would leak into the main valve body along the stem when the fluid pressure in the main valve body was low. Also, when the value of the fluid pressure in the main valve unit was higher than the value of the pressure of the pneumatic signal in the actuator unit, the fluid pressure from the main valve unit would leak along the valve stem into the actuator chamber and act on the diaphragm of the actuator so as to cause the same to further open the valve member, so that the main valve member was moved to a more open position than required by the pneumatic signal being directed to the actuator unit.

In addition, when such fluid operated valve positioner was utilized as an automobile exhaust gas recirculation valve as in the aforementioned copending patent application, the flow of hot exhaust gases between the sealing ring-like members and the valve stem deposited carbon particles on the stem and the moisture in the exhaust gases caused such deposited particles to corrode whereby the combination of carbon build up and corrison between the valve stem and the sealing ring-like members caused early seizing of the valve stem.

However, it was found, according to the teaching of this invention, that a seal means could be provided for such a valve stem which would substantially eliminate the aforementioned problems.

In particular, one embodiment of this invention provides a washer-like resilient seal member having an opening therethrough and press-fittingly receiving the valve stem therethrough in such a manner that an inner peripheral portion of the washer-like member is turned into substantially parallel sealing and wiping engagement with the stem while being substantially transverse to the remainder of the washer-like member, the turned inner peripheral portion of the washer-like seal member comprising an annular lip which extends along the stem beyond the remainder of the washer-like member in a direction toward the actuator chamber of the actuator unit while being exposed to the fluid pressure therein whereby the fluid pressure in the actuator chamber can act against the lip to further urge the lip against the stem for sealing purposes.

In this manner, the washer-like seal member of this invention acts as an effective seal for the valve stem so that substantial clearance can be provided for the aforementioned ring-like seal members whereby the same can function as a stem guide but do not inhibit the stem movement therethrough. Also, since the washer-like seal member of this invention is performing a sealing function, there is substantially no flow of exhaust gases along the stem so that the fluid flow and carbon build up problems are substantially eliminated.

Accordingly, it is an object of this invention to provide an improved seal assembly, the seal assembly of this invention having one or more of the novel features of this invention as set forth above or hereinafter shown or described.

Other objects, uses, and advantages of this invention are apparent from a reading of this description which proceeds with reference to the accompanying drawings forming a part thereof and wherein.

Figure 1:
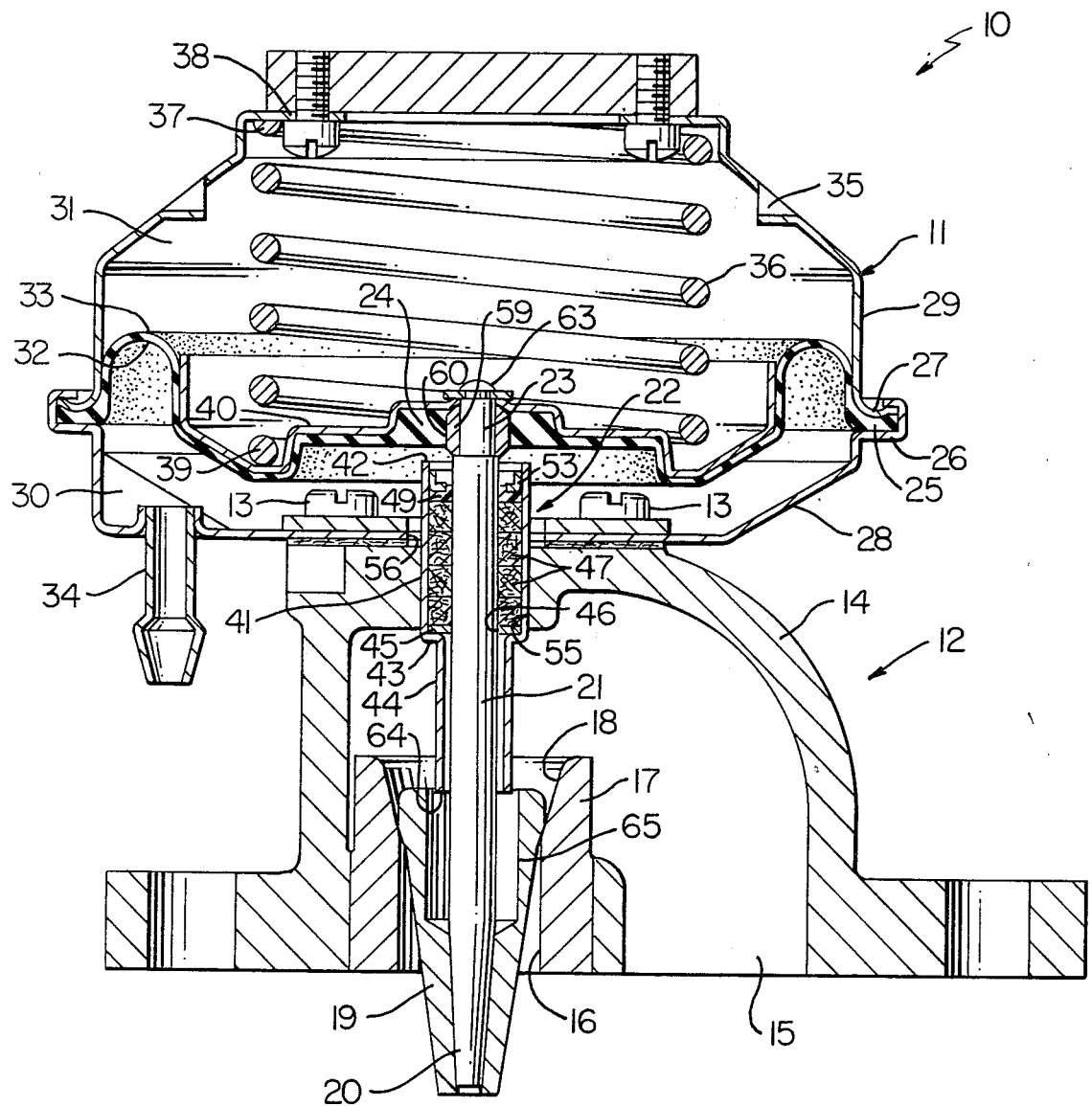
FIG. 1 is a cross-sectional view illustrating the improved fluid operated valve positioner of this invention.

While the various features of this invention are hereinafter described and illustrated as being particularly adapted to provide a seal assembly for a fluid operated valve positioner, it is to be understood that the various features of this invention can be utilized singly or in any combination thereof to provide a seal means for a movable plunger utilized for other purposes as desired.

Therefore, this invention is not to be limited to only the embodiment illustrated in the drawings because the drawings are merely utilized to illustrate one of the wide variety of uses of this invention.

Referring now to FIG. 1, the improved fluid operated valve positioner of this invention is generally indicated by the reference numeral 10 and comprises an actuator unit which is generally indicated by the reference numeral 11 and a main valve unit which is generally indicated by the reference numeral 12, the actuator unit 11 and main valve unit 12 being suitably secured together, such as by the illustrated threaded fastening means 13 or the like.

The main valve unit 12 includes a housing means 14 having an inlet 15 and an outlet 16 formed by a tubular member 17 carried by the housing means 14 and having a frusto-conical valve seat 18 adapted to be opened and closed by a main valve member 19 that is carried on one end 20 of a substantially cylindrical plunger or valve stem 21 as illustrated.

The valve stem 21 extends through a seal means of this invention which is generally indicated by the reference numeral 22 so that the other end 23 of the valve stem 21 projects beyond the seal means 22 and is fastened to a flexible diaphragm 24 of the actuator unit 11, the flexible diaphragm 24 of the actuator unit 11 having the outer peripheral portion 25 thereof trapped between the secured together opened ends 26 and 27 of two cup-shaped housing members 28 and 29 which respectively cooperate with the flexible diaphragm 24 to define chambers 30 and 31 on opposite sides 32 and 33 thereof.

The chamber 30 of the actuator unit 11 comprises an actuator chamber adapted to receive a fluid pressure signal from a communicating tubular nipple means 34 that is adapted to be fluidly connected by flexible conduit means and the like to a changeable pressure source for a purpose hereinafter described.

The other chamber 31 of the actuator unit 11 is an atmospheric chamber as the same is adapted to be interconnected to the atmosphere by suitable opening means 55 formed in the housing means 29.

A compression spring 36 is disposed in the atmospheric chamber 31 and has one end 37 bearing against a closed end 38 of the housing means 29 while the other end 39 thereof bears against a diaphragm retainer 40 that is disposed against the side 33 of the diaphragm 24 and carried thereby whereby the effective force of the compression spring 36 is to tend to urge the flexible diaphragm 24 downwardly and, thus, through the valve stem 21, tend to move the main valve member 19 to its closed position against the valve seat 18 to disconnect the inlet 15 from the outlet 16 as illustrated in FIG. 1.

However, when fluid pressure is directed to the actuating chamber 30 through the inlet nipple 34 and creates a sufficient force acting against the side 32 of the diaphragm 24 to move the diaphragm 24 upwardly in opposition to the force of the compression spring 36 a certain amount, the upward movement of the diaphragm 24 carries the valve stem 21 and, thus, the main valve member 19 upwardly therewith to interconnect the inlet 15 with the outlet 16. Thus, by controlling the amount of pressure being directed to the actuator chamber 30, the valve member 19 can be positioned in various positions relative to the valve seat 18 so as to provide certain fluid flows between the inlet 15 and outlet 16 such as for the purpose of recirculating exhaust gas from an internal combustion engine back to the intake manifold thereof for the reasons set forth in the aforementioned copending patent application.

The seal means 22 of this invention comprises a cup-like metallic tubular member 41 having an upper open end 42 and a lower end 43 that is inwardly turned and intergrally interconnected to a smaller tubular portion or sleeve 44 for a purpose hereinafter described.

A disc-like metallic member 45 is disposed in the cup-like member 41 so as to be disposed against the bottom end 43 thereof, the disc-like member 45 having an opening 46 passing centrally therethrough and adapted to loosely receive the valve stem 21 therethrough as illustrated.

In addition, a plurality of ring-like packing seal members 47 are disposed in stacked relation in the cup-like member 41 on top of the disc member 45 and each has an inside diameter 48 that provides sufficient clearance between the seal members 47 and the valve stem 21 so as not to impede axial movement of the stem 21 relative to the seal members 47 while still providing a guiding function therefore as will be apparent hereinafter.

Figure 2:
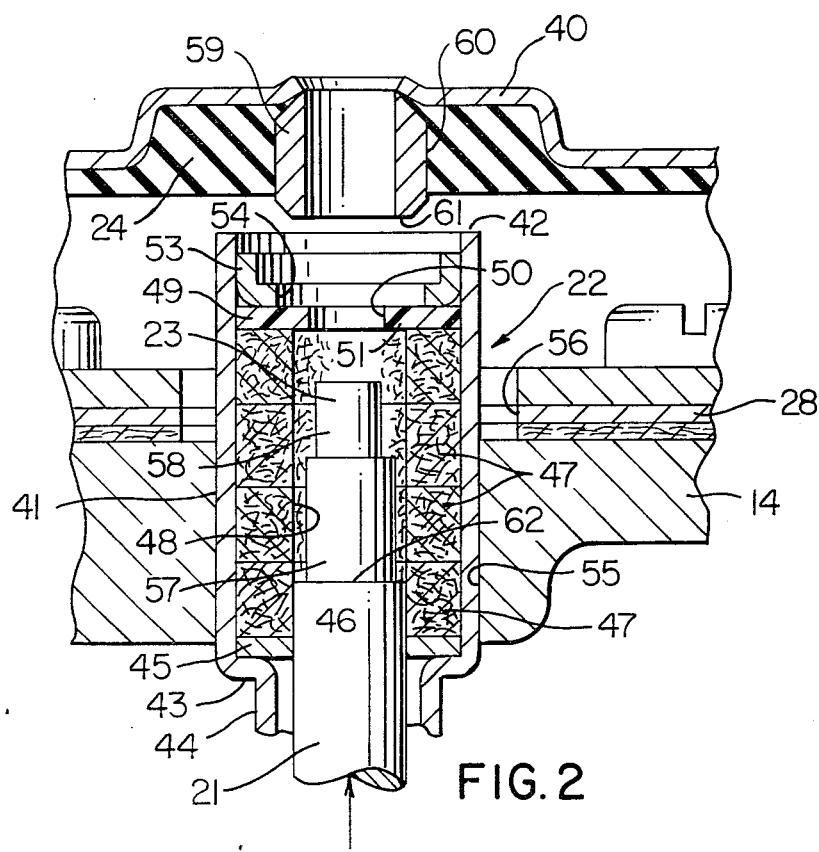
FIG. 2 is an enlarged, fragmentary, cross-sectional view illustrating the method of this invention of assembling the valve stem of the valve positioner of FIG. 1 into the seal means of this invention.
Figure 3:
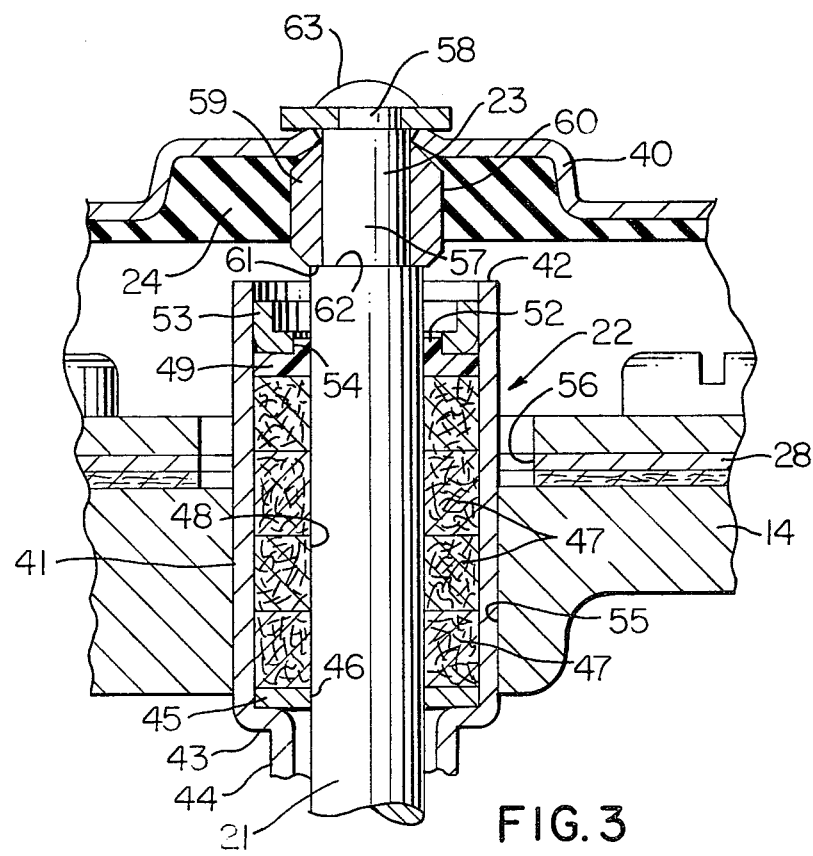
FIG. 3 is a view similar to FIG. 2 and illustrates the valve stem and seal means in the completed assembled condition thereof.

The seal means 22 of this invention includes a washer-like resilient seal member 49 which as best illustrated in FIG. 2 has an inside diameter 50 smaller than the outside diameter of the valve stem 21 for a purpose hereinafter described so that when the valve stem 21 is assembled to the seal means 22 in the manner illustrated in FIG. 2 by having the end 23 of the valve stem 21 inserted upwardly through the seal means 22 from the bottom 43 thereof toward the top 42 thereof, the valve stem 21 is press-fittingly forced through the opening 50 of the resilient seal member 49 to cause the inner peripheral portion 51 thereof to be turned upwardly into a substantially parallel sealing and wiping lip 52 as best illustrated in FIG. 3, the lip 52 being formed between the valve stem 21 and an annular metallic keeper 53 press-fitted into the open end 42 of the cup-like member 41 so as to sandwich the seal member 49 between the keeper 53 and the upper ring-like seal member 47 before the valve stem 21 is assembled thereto. The keeper 53 has an inside diameter 54 stepped inwardly not only from the inner peripheral portion 51 of the seal member 49, but also stepped inwardly from the inside diameters 48 of the ring-like seal members 47 as illustrated to permit the annular lip 52 of the washer-like seal member 49 to be formed in the above manner by the method of this invention.

While the valve stem 21 can be assembled to the seal means 22 before the seal means 22 is secured in an opening 55 formed through the housing means 14 of the valve unit 12 or after the cup-like member 41 has been secured in the opening 55, such as by welding or the like, it can be seen that after the upper end 23 of the valve stem 21 has been passed through the seal member 49 in the manner illustrated in FIG. 3, the upper stepped end 23 of the valve stem 21 can be fastened to the flexible diaphragm 24 of the actuator unit 11 as the upper end 42 of the cup-like member 41 projects through an aligned opening 56 formed in the housing means 28 of the actuator unit 11 so as to be received in the actuator chamber 30 thereof as illustrated.

In particular, the upper end 23 of the valve stem 21 is formed with a pair of stepped down integral portions 57 and 58 with the larger stepped portion 57 adapted to be received through a tubular member 53 carried by the inner peripheral portion 60 of the flexible diaphragm 24 until the lower end 61 of the metallic tubular member 59 rests on an annular shoulder 62 of the valve stem 22 defined between the stepped portion 57 thereof and the main body portion of the valve stem 21 as illustrated. Thereafter, the smaller stepped portion 58 of the valve stem 22 can be peened over to form a rivet head 63 as illustrated in FIGS. 1 and 3 to fasten the upper end 23 of the valve stem 21 to the flexible diaphragm 24 so that the valve stem 21 will move in unison with the flexible diaphragm 24 as previously described.

While the ring-like seal members 47 and resilient seal member 49 of this invention can be formed of any desired suitable sealing materials, it has been found in one embodiment of the valve positioner 10 of this invention wherein the valve stem 21 has an outside diameter of approximately 0.186 of an inch, the ring-like members 47 can have the inside diameters 48 thereof provide a clearance with the outside diameter of the valve stem 21 of approximately 0.006 of an inch while being formed of approximately 80 percent graphite and approximately 20 percent ash and sold under the tradename GRAFOIL by the Union Carbide Corporation of New York, N.Y. The washer-like resilient seal member 49 was approximately 0.015 of an inch thick and had an inside diameter of approximately 0.130 of an inch that is approximately 0.057 of an inch smaller than the outside diameter of the valve stem 21, the washer-like resilient seal member 49 being formed of polytetrafluoroethylene sold under the tradename TEFLON-TFE by the E. I. du Pont De Nemours and Company, Inc. of Wilmington, Del. and being filled with graphite in an amount that is approximately 10 to 15 percent of the weight.

The sleeve 44 of the cup-like member 41 extends downwardly along the valve stem 21 in such a manner that the lower end 64 thereof is adapted to project into an annular groove 65 formed in the main valve member 19 when the main valve member 19 is disposed in the closed position illustrated in FIG. 1 so that when the valve member 19 is pulled upwardly by the valve stem 21 relative to the sleeve 44 to open the valve seat 18, the sleeve 44 is further received in the groove 65 of the valve member 19 to protect the valve stem 21 at all times from any adverse effects from the fluid being conveyed from the inlet 15 of the main valve unit 12 to the outlet 16 thereof whereby the combined effect of the sleeve 44 and the seal member 49 of the improved seal means 22 of this invention prevent corrison and carbon build up not only on the lower portion of the stem 21 that would prevent its movement upward into the packing rings 47, but also the seal means 22 prevents the exhaust gases from the valve unit 12 from entering the chamber 30 of the actuator unit 11 or the fluid pressure from the actuator unit 11 from entering the main valve unit 12 for the reasons previously set forth.

Therefore, it can be seen that the seal means 22 of this invention for the valve stem 21 of the valve positioner 10 can be formed in a simply and effective manner by the method of this invention previously described to permit the fluid operated valve positioner 10 to operate in a manner now to be described.

With the chamber 30 of the valve positioner 10 being interconnected to a suitable signal pressure source, and should the force of the signal being directed to the chamber 30 not be sufficient to overcome the force of the compression spring 36 holding the diaphragm 24 in the position illustrated in FIG. 1, the main valve member 19 is disposed against the valve seat 18 to maintain the same in the closed condition so that no fluid from the inlet 15 can pass through the outlet 16 thereof.

However, when the force of the fluid pressure signal being directed to the actuating chamber 30 of the actuator unit 11 is sufficient to overcome the force of the compression spring 35 so as to move the diaphragm 24 upwardly to a certain position thereof wherein a balance is created between the force of the compression spring 36 and the force fluid pressure in the actuator chamber 30, the valve member 19 is moved upwardly to open the valve seat 18 a certain amount so as to permit a certain fluid flow between the inlet 15 and the outlet 16 thereof for any desired purpose, such as for the engine exhaust gas recirculation feature previously described.

Should the force of the pressure signal being directed to the chamber 30 further increase, such increase in pressure in the fluid chamber 30 will further open the valve member 19 relative to the valve seat 18 to increase the fluid flow to the outlet 16. Conversely, a decrease in the force of the pressure signal to the chamber 30 will cause the diaphragm 24 to move downwardly and, thus, move the valve member 19 closer to the valve seat 18 and thereby decrease the flow of fluid from the inlet 15 to the outlet 16 thereof.

During the operation of the valve positioner 10 previously described, it can be seen that any corrosive fluid passing through the valve unit 12 from its inlet 15 to its outlet 16 will be prevented from flowing into the actuator chamber 30 of the actuator unit 11 to change the pressure condition therein as the washer-like seal member 49, through its lip 52 thereof, completely seals the actuating chamber 30 from the main valve unit 12 as the fluid pressure in the actuating chamber 30 acts against the lip 52 thereof to hold the same in sealing and wiping engagement with the valve stem 21. This wiping engagement of the sealing lip 52 with the valve stem 21 also prevents the build up corrosive producing particles on the valve stem 21 through its up and down movement in the seal means 22. Also, the seal member 49 of this invention prevents any fluid pressure from the actuating chamber 30 from passing along the stem 21 into the main valve unit 12 so as to decrease the force of the pressure signal in the actuating chamber 30 so that a more accurate positioning of the valve member 19 relative to the valve seat 18 can take place than would be the case if the washer-like seal member 49 of this invention were not provided for the reason previously set forth.

Therefore, it can be seen that this invention not only provides an improved seal assembly for a valve positioner or the like, but also this invention provides an improved method of making such a seal assembly or the like.

While the form and method of this invention, now preferred, have been illustrated and described as required by the Patent Statute, it is to be understood that other forms and method steps can be utilized and still fall within the scope of the appended claims.

What is claimed is:

1. In a method of making an assembly of a seal means and a plunger movable relative to said seal means, the improvement comprising the steps of forming said seal means with a relatively thin and substantially flat washer-like resilient seal member having an opening therethrough, forming said seal means from a cup-like member through which said plunger extends, disposing said washer-like member in said cup-like member to be carried thereby, disposing a plurality of ring-like seal members in stacked relation in said cup-like member so as to receive said plunger therethrough, causing one of said ring-like seal members to abut said washer-like seal member, disposing a ring-like keeper in said cup-like member to sandwich said washer-like seal member between said keeper and said one ring-like seal member, and press-fitting said plunger through said opening in such a manner that an inner peripheral portion of said washer-like member is turned into substantially parallel sealing and wiping engagement with said plunger while being substantially transverse to the remainder of said washer-like member, said washer-like seal member initially extending radially inboard of said ring-like seal members and said keeper and said step of press-fitting said plunger through said opening of said washer-like seal member taking place after said washer-like seal member, said ring-like seal members and said keeper are disposed in said cup-like member.

2. A method as set forth in claim 1 wherein said step of press-fitting said plunger causes said turned inner peripheral portion of said washer-like seal member to form an annular lip that extends along said stem beyond the remainder of said washer-like seal member.

3. A method as set forth in claim 2 and including the step of forming said assembly with an actuator unit that has a fluid pressure chamber, and disposing said plunger so that said lip of said seal member is directed toward said chamber and is exposed to the fluid pressure therein whereby said fluid pressure in said chamber acts against said lip to urge said lip against said plunger.

4. A method as set forth in claim 2 and including the step of forming said washer-like seal member from a graphite filled polytetrafluoroethylene material.

5. A method as set forth in claim 4 and including the step of forming said washer-like seal member to be approximately 0.015 of an inch thick and initially having an inside diameter that is approximately 0.057 of an inch smaller than the outside diameter of said stem, said outside diameter of said stem being approximately 0.186 of an inch.

6. A method as set forth in claim 1 and including the step of forming said cup-like member with a tubular sleeve that extends therefrom and surrounds said plunger from said cup-like member to one end of said plunger.

7. A method as set forth in claim 6 and including the step of forming said one end of said plunger with a groove therein which receives said sleeve when said plunger is moved to one position thereof relative to said sleeve.

8. A method as set forth in claim 1 wherein said keeper has an inner periphery disposed radially outboard of the inner periphery of said one ring-like seal member that abuts said washer-like seal member and wherein said step of press-fitting said plunger through said opening of said washer-like seal member includes the step of inserting said plunger through said ring-like seal members in the direction toward said keeper so that said inner peripheral portion of said washer-like seal member is turned between said plunger and said inner periphery of said keeper as said plunger is inserted through said keeper.

* * * * *